(12) United States Patent
Fainberg et al.

(10) Patent No.: US 11,463,482 B2
(45) Date of Patent: Oct. 4, 2022

(54) ADAPTIVE ACCESS CONTROL MANAGEMENT

(71) Applicant: FORESCOUT TECHNOLOGIES, INC., San Jose, CA (US)

(72) Inventors: Ilya Fainberg, Tel Aviv (IL); Tomer Reisner, Rehovot (IL)

(73) Assignee: FORESCOUT TECHNOLOGIES, INC., San Jose, CA (US)

( * ) Notice: Subject to any disclaimer, the term of this patent is extended or adjusted under 35 U.S.C. 154(b) by 231 days.

(21) Appl. No.: 16/352,618

(22) Filed: Mar. 13, 2019

(65) Prior Publication Data

US 2020/0296139 A1   Sep. 17, 2020

(51) Int. Cl.
    H04L 9/40    (2022.01)
(52) U.S. Cl.
    CPC .......... H04L 63/205 (2013.01); H04L 63/101 (2013.01); H04L 63/102 (2013.01); H04L 63/02 (2013.01)
(58) Field of Classification Search
    CPC ... H04L 63/205; H04L 63/101; H04L 63/102; H04L 63/02
    See application file for complete search history.

(56) References Cited

U.S. PATENT DOCUMENTS

| 10,771,506 | B1* | 9/2020 | Kumar | H04L 63/02 |
| 2014/0280829 | A1 | 9/2014 | Kjendal et al. | |
| 2014/0379915 | A1* | 12/2014 | Yang | H04L 63/101 |
| | | | | 709/225 |
| 2015/0326528 | A1 | 11/2015 | Murthy et al. | |
| 2017/0250951 | A1* | 8/2017 | Wang | H04L 41/0869 |
| 2018/0176185 | A1 | 6/2018 | Kumar et al. | |
| 2018/0234459 | A1* | 8/2018 | Kung | H04L 63/0263 |
| 2019/0260641 | A1* | 8/2019 | Giust | H04L 67/141 |
| 2020/0296139 | A1* | 9/2020 | Fainberg | H04L 63/0209 |
| 2021/0279079 | A1* | 9/2021 | Shrivastava | G06Q 30/0601 |

FOREIGN PATENT DOCUMENTS

WO    20180106499 A1    6/2018

OTHER PUBLICATIONS

International Search Report and Written Opinion for International Application No. PCT/US2020/019275, dated Jun. 9, 2020.
Transmittal of International Preliminary Report on Patentability dated Sep. 23, 2021, for International Application No. PCT/US2020/019275, filed Feb. 21, 2020, pp. 10.

* cited by examiner

Primary Examiner — Harris C Wang
(74) Attorney, Agent, or Firm — Womble Bond Dickinson (US) LLP

(57) ABSTRACT

Systems, methods, and related technologies for access control management are described. The access control management may be customized for an entity and be configured on an enforcement point closest to the entity. In certain aspects, an entity communicatively coupled to a network is selected and one or more characteristics of the entity determined. An access policy may be selected based on the one or more characteristics of the entity and one or more enforcement points closest to the entity determined. One or more access rules to be assigned to the one or more enforcement points based on the access policy may be determined and the one or more access rules assigned to or configured on the one or more enforcement points closest to the entity.

16 Claims, 5 Drawing Sheets

ADAPTIVE ACCESS CONTROL MANAGEMENT

TECHNICAL FIELD

Aspects and implementations of the present disclosure relate to network access, and more specifically, configuration of enforcement points based on one or more characteristics of an entity.

BACKGROUND

As technology advances, the number and variety of devices that are connected to communications networks are rapidly increasing. Each device may have its own respective vulnerabilities which may leave the network open to compromise or other risks. Preventing the spreading of an infection of a device or an attack through a network can be important for securing a communication network.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
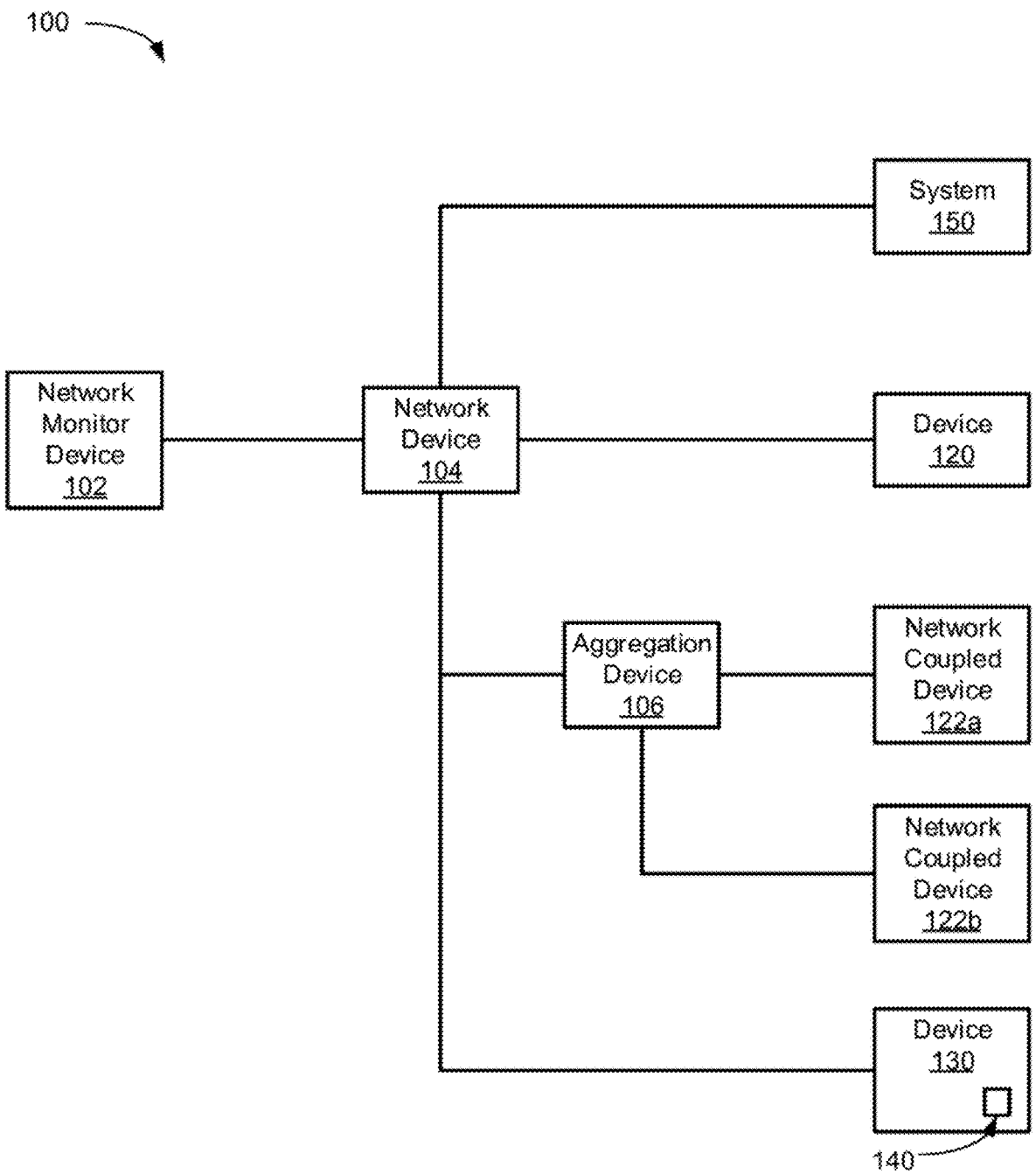
FIG. 1 depicts an illustrative communication network in accordance with one implementation of the present disclosure.

Aspects and implementations of the present disclosure are directed to access management including access management at the edge of a network. The systems and methods disclosed can be employed with respect to network security, among other fields. More particularly, it can be appreciated that devices with vulnerabilities are a significant and growing problem. At the same time, the proliferation of network-connected devices (e.g., internet of things (IoT) devices such as televisions, security cameras (IP cameras), wearable devices, medical devices, etc.) can make it difficult to effectively ensure that network security is maintained. Accordingly, described herein in various implementations are systems, methods, techniques, and related technologies, which allows customized access configurations including determination of access rules for each entity and applying or assigning access rules at an enforcement point (e.g., network device, for instance, a network switch) closest to the entity.

Network segmentation can be used to enforce security policies on a network, for instance in large and medium organizations, by restricting portions or areas of a network which a device can access or communicate with. Segmentation or "zoning" can provide effective controls to limit movement across the network (e.g., by a hacker or malicious software). Enforcement points including firewalls, routers, switches, cloud infrastructure, other network devices, etc., may be used to enforce segmentation on a network (and different address subnets may be used for each segment). Enforcement points may enforce segmentation by filtering or dropping packets according to the network segmentation policies/rules. The viability of a network segmentation project depends on the quality of visibility the organization has into its devices and the amount of work or labor involved in configuring network devices.

Historically, the traditional approach to network segmentation was based on creating defined static network zones or segments based on IP address or VLAN. The segments are configured in advance allow creation and use of traffic filters, such as access control lists (ACLS), to handle broad access scenarios between network elements. The filters are typically implemented on firewalls. The board access scenarios between network elements includes any IP address in a zone to any IP address in another zone. This was the way that legacy static IPv4 networks were and are configured. The shift to IPv6 and exponential growth in the number of devices across campus, data-center, and cloud results in more flat and dynamic networks where the static approach is no longer sufficient nor applicable. Existing current static segmentation methods are no longer able to keep up with both the network growth and the network changes. An existing methodology attempts to solve this problem using proprietary hardware, 802.1x, and data tags based on hardware.

Traditionally network engineers would maintain static scripts which include static source and destination filters. These scripts were applied manually and maintained manually making the process not scalable. Filters apply to the source and destination of a communication and thereby the filters created with such manual methods do not differentiate the device types on a particular subnet or segment. In particular, a single broad segment rule does not have the capability to differentiate among device types, users, and other characteristics.

Common network topologies have multiple devices communicatively coupled to a network device, including a switch or wireless access point, and the network device is in turn coupled to a firewall. This means that a firewall segmentation policy may restrict communications to and from the devices behind the firewall but the devices behind the firewall that are coupled to the network devices (e.g., switches) are able to communicate with each other unrestricted by the segmentation policy of the firewall. The result is that an attack or compromise on the devices behind the firewall may spread laterally among the devices behind the firewall. In other words, there can be a sizable number of devices on a substantially flat network behind the firewall.

Segmentation is often done by applying a tag to a device based on the IP scheme. The determination and application of tags to devices is manual. The manual nature of the tagging limits the effectiveness of the segmentation and in some cases even the viability of a segmentation project. For example, a segmentation scheme may indicate that devices in a 10.10.10.x subnet are application servers and thus each server with an IP address in the 10.10.10.x subnet is assigned an application tag. The tags are thus statically mapped to a device based on IP address. Devices within a particular IP address range are likely able to communicate between each other which could allow an attack to spread laterally.

If a device is assigned a tag based solely on the IP address and if the IP address does not match the segmentation scheme, then a device may be tagged with a tag that does not properly match the segmentation scheme. For example, if a printer gets an IP address that is associated with an IP camera segment, then the printer may be restricted from operating properly by being prevented from communicating with devices such as laptops and desktops.

Where VLANs are used, devices in a VLAN may communicate amongst themselves thereby allowing an attack to spread laterally between the devices. For example, a "Flat Network" may consists of one large VLAN e.g., a VLAN comprising all of the devices on a network) or multiple VLANS that contain multiple user roles and device types. A flat network, segment, or VLAN is a non-hierarchical network topology, where each device is unrestricted by the network in communicating with other devices on the network. Each device will have the same basic permissions behind the firewall. So within the campus each device will have the same permissions and can access the same things.

VLANs are often assigned by floors or buildings meaning large number of devices are permitted to communicate amongst themselves thereby creating risk of an attack spreading laterally. For example, if an entire campus or substantial portion thereof of is behind a single firewall, each of the devices on the campus may be unrestricted in communicating with each other thereby allow an attack or compromise to spread between any of the devices on the campus. As another example, if there is a firewall on the fourth floor of a building between the fourth floor devices and devices on the first three floors, meaning that the devices on the first, second, and third floors are in a single segment and thereby able to communicate in an unrestricted manner. The unrestricted communications of the first three floors of the building means that lateral movement of an attacker or compromise is not restricted. This creates a substantial risk, especially for IoT devices which are often not designed with security in mind and not easily updated.

An entity or entities, as discussed herein, include devices (e.g., computer systems, for instance laptops, desktops, servers, mobile devices, IoT devices, OT devices, etc.), endpoints, virtual machines, services, serverless services (e.g., cloud based services), containers (e.g., user-space instances that work with an operating system featuring a kernel that allows the existence of multiple isolated user-space instances), cloud based storage, accounts, and users. Depending on the entity, an entity may have an IP address (e.g., a device) or may be without an IP address (e.g., a serverless service). Embodiments are able to dynamically (e.g., on the fly or responsive to changing conditions, for instance an entity being communicatively coupled to a network or in response to determination of characteristics of an entity) control access of various entities or micro-segment various entities, as described herein.

The enforcement points may be one or more network devices (e.g., firewalls, routers, switches, virtual switch, hypervisor, SDN controller, virtual firewall, etc.) that are able to enforce access or other rules, ACLS, or the like to control (e.g., allow or deny) communication and network traffic (e.g., including dropping packets) between the entity and one or more other entities communicatively coupled to a network. Access rules may control whether an entity can communicate with other entities in a variety of ways including, but not limited to, blocking communications (e.g., dropping packets sent to one or more particular entities), allowing communication between particular entities (e.g., a desktop and a printer), allowing communication on particular ports, etc. It is appreciated that an enforcement point may be any device that is capable of filtering, controlling, restricting, or the like communication or access on a network.

Embodiments are configured to provide access control or micro-segmentation at the edge of a network to filter traffic (e.g., via one or more ACLs). Embodiments are able to determine various entity (e.g., device, user, etc.) characteristics to determine one or more access rules (e.g., ACLs) to thereby create a set of access rules around each specific entity (e.g., device, user, etc.) based on various characteristics (e.g., categorization, classification, etc.). The use of dynamically generated and customized access rules (e.g., ACLs) based on various characteristics thereby allows preventing or restricting lateral movement of an attack or compromise on a network.

Embodiments may apply dynamic access rules (e.g., ACLs) automatically (e.g., without user interaction). For example, a policy engine may be used to discover devices (e.g., endpoint devices, users, etc.), evaluate characteristics thereof, dynamically determine and apply access rules, and adapt to changes (e.g., when new devices come on to the network or devices move around the network). Embodiments are able to change the content of access rules as the entities on a network change. For example, if a user changes on a device, new access rules may be determined, and applied to the port where the device associated with the user is communicatively coupled to a network switch. Embodiments may thus apply access rules on a per device basis instead of segment or zone basis (e.g., which contain numerous devices in each segment). Embodiments are further able to control access for unmanaged devices (e.g., IoT devices) which is traditionally very difficult to do.

For example, embodiments can apply or assign one or more ACLs based on a device coming on the network, determining characteristics of the entity (e.g., device, user, etc.), determining access controls for the entity, and applying one or more ACLs (e.g., the network device where the device, user, etc., is communicatively coupled). Embodiments are thus able to setup access constraints based on the entity instead of general traffic constraints which can be much more complex to manage.

Embodiments can apply access rule (e.g., ACLs) dynamically without requiring any preliminary deployment issues or in depth network analysis. Embodiments are capable of acting as an overlay so that network architecture does not need to be changed. For example, the changing of VLANs can require significant effort from a networking team. Embodiments are able to configure existing network infrastructure (e.g., network switches) thereby avoiding the need to purchase new network equipment. The configuring of network infrastructure can be automated by embodiments thereby simplifying maintaining and updating of access rules. Embodiments are able to dynamically apply the network rules without requiring preliminary network analysis or significant planning.

Embodiments thus support going from a flat network with zero segments to a network with particular segments for each entity at the edge of the network based on dynamic access rules. Embodiments are thus able to provide access control at the edge of a network thereby overcoming the shortcomings of traditional firewall based segmentation strategies which are unable to provide access control at the edges because firewalls are not located at the edges of the network. In other words, firewalls do not have the capability to extend their filtering capability to the edge of the network. Embodiments may thus enable micro-segmentation at the edge of the network.

Embodiments may thus use one or more access rules (e.g., ACLs) based on the device type, the user role, or combination thereof to wrap up an access control "bubble" around device. The access rules may be used to isolate communications between devices of the same type or similar users. For example, ACLs may be configured on the port where a printer is communicatively coupled and the ACLs restrict communications to other printers thereby preventing lateral movement of an attack. As another example, an accounting department user may be using a desktop which is communicatively coupled to a port of a switch which has ACLs configured on the port that prevents communications with other desktop devices where other accounting department users are logged in.

Embodiments are able to combine asset inventory information (e.g., device classification, device identification, etc.) with a dynamic granular access control engine thereby applying access rules (ACLs) at the edge of the network that are customized for each particular device. Human involvement and maintenance is significantly reduced or eliminated and resource utilization efficiency increased. This thereby removes the need to have manually executed scripts and network engineers applying and maintaining those scripts.

The dynamic nature of the access control of embodiments provides administrators a solid and adaptable solution that does not require frequent labor intensive maintenance efforts that often result in network downtime and revenue loss as a result. Security for each entity is therefore tightened and tailored for each entity on the network by dynamically adjusting access rules across the network.

For example, a policy may specify access control rules for an IP camera and embodiments are capable of determining and applying ACLs at the switch or wireless access point where the IP camera is communicatively coupled based on one or more characteristics of the IP camera (e.g., the location of the IP camera, the categorization of the IP camera (e.g., based on manufacturer, firmware, model, device type, device risk, user, etc.)). Embodiments thereby provide granular access control instead of a static and board flat segment.

Embodiments can be used be in a variety of environments including, but not limited to, campus, data center, cloud, and operational technology or industrial environments. Further embodiments are able to provide adaptive access control without necessitating the purchase of new hardware or use of specific authentication protocols, such as 802.1x.

Embodiments are further able to provide adaptive access control (e.g., ACLs) management providing technology agnostic traffic filtering that is vendor agnostic and dynamically creates policy rules which automatically adjust access according to evolving environment changes, business needs, and threats. The adaptive access control thus can update ACLs of one or more switches or wireless controllers dynamically. The adaptive access control further enables operators to define policies based on entity characteristics, groups of entity characteristics, etc., which are translated into vendor specific or enforcement point specific commands and configurations (e.g., as vendor specific source and destination objects in an ACL).

Embodiments may be used with IoT or OT devices that do not stay active continuously. For example, an OT device may activate its Ethernet interface, send some communications, and then enter a low power state where the Ethernet interface is turned off. Each time the OT device does this it may get a different IP address and thus have its communications to other devices restricted. Embodiments are able to dynamically configure access controls for upon the addition or communication of a device thereby solving the communication restrictions problems and other problems created by devices that operate intermittently.

As an example, if an ACL allows devices of groups A to communicate with devices of Group B and Group A includes devices one and two and Group B includes devices three and four. When a device five is added or comes on to the network, it may not be allowed to communicate as a member of Group A with devices of Group B. Embodiments are able to configure the access rules for groups A and B to be dynamically updated on one or more network devices (e.g., switches) to allow device five (of Group A) to communicate with devices of Group B.

An access or micro-segmentation policy, in accordance with embodiments, can include a variety of rules for a variety of entities (e.g., users, devices, locations, compliance, risk, etc.). The rules can be applied or configured on one or more enforcement points (e.g., a switch, for instance an access switch, a core switch, an aggregation switch or combination thereof, firewall, router, wireless controller, VPN gateway, virtual network infrastructure, cloud infrastructure, etc.). In some embodiments, ACLs are used to provide granular access control or micro-segmentation on a per port or per entity basis (e.g., ACLs customized specifically for each entity). For example, a printer may be restricted from communicating with other printers based on ACLs on a switch instead of the being in a printer segment where each printer can communicate with each other, for instance on a printer VLAN segment.

Embodiments are thus able to allow configuration of a segmentation policy that is independent of the vendor or manufacturer and technology of the enforcement points of a network. Embodiments are able to allow configuration of a segmentation policy in a manner agnostic to the underlying technology (e.g., by translating access rules according to the enforcement point where the rules will be applied). In other words, the policies are abstracted from the underlying technology of the network. Embodiments are able to receive decisions or intent of the segmentation policy and then translate the segmentation policy for implementation on the enforcement points at the edge of the network. Whether the network environment has enforcement points that include firewalls, switches, virtual enforcement points (e.g., NSX from VMware™), such details may be hidden from a user allowing the user to focus on determining an access policy which defines which traffic is allowed and which traffic is not allowed. For example, an access policy may not allow or block IP cameras, printers, infusion pumps, or any combination thereof from communicating with each other. As another example, an access policy could block an accounting server from talking to a marketing server. As another example, entities on certain networks or environments, for instance, OT entities and campus IT entities, are isolated from each other (e.g., using access rules assigned to an enforcement point where the entity is connected to the network). As another example, hospital equipment, for instance, a magnetic resonance imaging (MRI) machine and a computerized tomography (CT) scan machine may be restricted, based on access rules, to only communicate with a vendor update server. Embodiments can thus enable granular access control customized for each entity based on granular characteristics (e.g., user role, application role, device classification, location, compliance, risk, etc.) and on different portions of the networks (e.g., campus, OT, data center, and cloud).

Embodiments may include a controller (e.g., software defined controller, system 400, etc.) for orchestration and automation of segmentation in a heterogeneous environment, with multiple segmentation technologies across campus, data center, OT, cloud, etc. The controller is able to push, configure, or assign an access policy customized or translated for the each enforcement point on the network specific to each entity. For example, a single policy may be translated into one or more ACLs customized for a particular IP camera which allows the IP camera to communicate with a limited number of other entities (e.g., a server, a desktop computer used for administration, or a combination thereof) while also not being allowed to communicate with other IP cameras or other devices (e.g., printers, IoT devices, etc.).

This policy can be enforced in different ways based on the enforcement points of the network. For example, an ACL of a switch may be configured, a set command sent to configure a firewall (e.g., at the edge of the network), and a virtual network group set for a virtual environment. The concatenation of the string of specific actions drives the access policy to be implemented across the network. The policy may have different enforcement actions when implemented on various enforcement points but is a single policy (e.g., as far as the user is concerned). Embodiments thus simplify implementation with a single access policy (e.g., implemented in a customized manner for each entity) instead of access policies for each environment or enforcement point technology (e.g., a firewall policy, a NSX policy, an Amazon web services (AWS™) policy, an Azure™ policy, an ACL switch policy, etc.). Embodiments are thus able to manage segmentation across a variety of enforcement points to control access or communications on a per entity basis or in a manner specific to each entity.

Advantageously, embodiments are configured to avoiding costly and labor intensive massive hardware and software refreshes, and network re-architecture while reducing the required human resources involved with operating segmentation or access control policies across multiple technologies. That is, embodiments enable better use of enforcement points and reduction in the number of people involved to manage access control. Users are thus able to use what equipment they currently have and leverage it more consistently. This allows avoiding buying new technologies from a vendor for the purpose of trying to keep pace with security trends.

Embodiments further enable continuous and automatically adaptive granular access control or micro-segmentation policy changes as a network changes, including automatic segmentation configuration of new network devices (e.g., switch) upon addition to the network (e.g., upon being detected as communicatively coupled to the network), or the case of replacement. For example, if a switch device fails, it may be replaced with a new switch which can then be configured by embodiments to implement access control. In some cases, minimal configuration of the switch may be necessary to allow communication with embodiments to enable the configuration of the access control policy.

Embodiments are adaptive to changes including business changes (e.g., new devices added to the network) or risk changes (e.g., new threats that can be restricted through segmentation). This avoids the need to manually adopt an access policy because an automatic and adaptive access control policy implementation is supported. The access control policy can implemented on enforcement points as a continuous and automatic adaptive segmentation policy.

Embodiments may have functionality for dynamic determining of access rules for entities based on characteristics of each entity (e.g., on an identification, classification, categorization (e.g., type of user or type of service), source and destination connections, or a combination thereof). The characteristics may be dynamically determined in an agentless manner and multiple access rules may be assigned to a network device or enforcement point where an entity is communicatively coupled thereto.

For example, embodiments simplify access control management in environments with IoT devices which allows for an efficient solution for containing the threat that IoT devices present and reduces that attack surface around it. The lack of the possibility of deploying an agent on most IoT devices makes access rules (e.g., at the edge of the network) customized for IoT device the choice to proactively contain IoT based threats in a specific environment so the risk does not spread further on the network or between IoT devices. Further, embodiments provide an efficient way to mitigate ransomware attacks, which are becoming more prevalent.

Accordingly, described herein in various implementations are systems, methods, techniques, and related technologies, which may perform access control or micro-segmentation policy management and implementation. As described herein, various techniques can be used to manage and configure (e.g., using translation, as described herein) one or more access control policies based on various entity characteristics.

It can be appreciated that the described technologies are directed to and address specific technical challenges and longstanding deficiencies in multiple technical areas, including but not limited to network security, monitoring, and policy enforcement. It can be further appreciated that the described technologies provide specific, technical solutions to the referenced technical challenges and unmet needs in the referenced technical fields.

FIG. 1 depicts an illustrative communication network 100, in accordance with one implementation of the present disclosure. The communication network 100 includes a network monitor device 102, a network device 104, an aggregation device 106, a system 150, devices 120 and 130, and network coupled devices 122*a-b*. The devices 120 and 130 and network coupled devices 122*a-b* may be any of a variety of devices including, but not limited to, computing systems, laptops, smartphones, servers, Internet of Things (IoT) or smart devices, supervisory control and data acquisition (SCADA) devices, operational technology (OT) devices, campus devices, data center devices, edge devices, etc. It is noted that the devices of communication network 100 may communicate in a variety of ways including wired and wireless connections and may use one or more of a variety of protocols.

Network device 104 may be one or more network devices configured to facilitate communication among aggregation device 106, system 150, network monitor device 102, devices 120 and 130, and network coupled devices 122*a-b*. Network device 104 may be one or more network switches, access points, routers, firewalls, hubs, etc.

Network monitor device 102 may be operable for a variety of tasks including access management including selecting an entity (e.g., based on a continuous or periodic scan, upon the entity communicatively coupling to the network, a user logging in, etc.) and determining one or more characteristics associated with the entity (e.g., classification, identification, user type, location, risk, compliance, etc.), as described herein. Based on the characteristics associated with the entity, an access policy may be accessed. The access policy may be part of or based on a segmentation policy and may define which communications are allowed for various device types, users, which ports can be used, communications that are not permitted, devices that are permitted to communicate with particular entity types, which user roles are allow to access particular resources, etc.

Network monitor device 102 can determine one or more enforcement points where the entity is communicatively coupled to the network and thereby determine the one or more enforcement points closest to the entity. For example, network monitor device 102 may access information on a switch (e.g., a switch cache) to determine a port (e.g., physical port, wireless port, or virtual port) where an entity with a particular IP address or MAC address or other identifier is communicatively coupled. Network monitor device 102 may also access information from a wireless access point where the entity is communicatively coupled. In some embodiments, network monitor device 102 may poll information from a cloud service to determine where an entity is communicatively coupled or connected to a network. In various embodiments, network monitor device 102 access syslog or SNMP information from an entity itself to determine where an entity is communicatively coupled or connected to a network (e.g., without accessing information from a network entity or enforcement point). Network monitor device 102 supports applying access policies in situations where an entity is communicatively coupled to a network with more than one connection (e.g., a wired connection and a wireless connection).

Based on the enforcement point, network monitor device 102 determines the one or more access rules to be assigned to the one or more enforcement points based on the access policy. In some embodiments, based on information about the one or more enforcement points closest to the entity, network monitor device 102 translates the access policy into one or more commands that will be used to configure the access rules on the one or more enforcement points. The closest enforcement point to an entity can be enforcement point where the entity is communicatively coupled. The enforcement point may be network device or network infrastructure device closest in proximity (e.g., physical proximity) to the entity. The enforcement point comprises the port where the entity is communitive coupled to the network, and communication to and from the entity is sent first through that port. In some embodiments, the port of the enforcement point is the last point of communication within network infrastructure before communication is sent to the entity. In various embodiments, the closest enforcement point is where communication from the entity is initially sent when communications are sent from the entity (e.g., prior to communications with the network backbone or Internet backbone). For example, the closest enforcement to an entity connected to a switch is the switch. As another example, the closest enforcement point to an entity wirelessly communicatively coupled to a wireless access point is wireless access point. In various embodiments, network monitor device 102 may access the current configuration of the one or more enforcement points to determine the access rules (e.g., ACLs) that are to be applied to the one or more enforcement points, as described herein. In some embodiments, an entity is communicatively coupled to a a wireless controller via a wireless access point and the wireless controller or a switch is the closest enforcement point (e.g., based on the wireless controller or the switch being able to apply access rules, for instance ACLs, to communications of the entity, for instance, in the case where the wireless access point is not able to or does not have the functionality to apply access rules). In various embodiments, an entity is communicatively coupled to a layer 3 switch via a layer 2 switch and the layer 3 switch is the closest enforcement point (e.g., based on the layer 3 switch being able to apply access rules, for instance ACLs, to communications of the entity, for instance, in the case where the layer 2 switch is not able to or does not have the functionality to apply access rules).

Network monitor device 102 may then apply or assign the access rules to the one more enforcement points closest to the entity. Network monitor device 102 may communicate the access rules via application programming interfaces (APIs), command line interface (CLI) commands, Web interface, simple network management protocol (SNMP) interface, etc. In some embodiments, network monitor device 102 may verify that the one or more enforcement points have been properly or correctly configured based on the access rules.

Network monitor device 102 may provide an interface (e.g., a graphical user interface (GUI)) for viewing, monitoring, modifying, and implementing the access policy. In some embodiments, network monitor device 102 is operable to perform visualization (e.g., including tables or matrixes) of access policies and access rules that are being applied to an entity. Network monitor device 102 may further monitor network traffic over a period of time (e.g., user configurable) based on the access policy and report violations of the access policy or attempts to violate the access policy (e.g., a printer or IP camera improperly attempting to communicate with each other or other devices of their device type), as described herein.

Network monitor device 102 may further perform a variety of operations including identification, classification, and taking one or more remediation actions (e.g., changing network access of an entity, changing the virtual local area network (VLAN), sending an email, sending a short message service (SMS) message, etc.).

An enforcement point may be a router, firewall, switch, hypervisor, software-defined networking (SDN) controller, virtual firewall, or other network device or infrastructure that may have an ACL like or rule like policy or functionality to apply based on the port where an entity is communicatively coupled thereto. Enforcements points may also be a next generation firewall (NGFW) and cloud infrastructure. A NGFW can be updated with an ACL like policy regarding an entity accessing the Internet. Cloud infrastructure (e.g., amazon web services (AWS) security groups) can be updated to drop packets from the IP of the entity that have a destination outside the cloud. Embodiments are operable to configure enforcement points at the edge of a network where an entity is communicatively coupled thereto thereby controlling access of the entity on a customized basis (e.g., customized or tailored for the entity).

In some embodiments, if the categorization or characteristics functionality is being updated (e.g., which could result in a change in one or more access rules that are assigned to an enforcement point closest an entity and thus impact the enforcement of an access policy by the enforcement points), notifications may be sent (e.g., via email or other methods as described herein) or presented to a user e.g., via a graphical user interface (GUI)) to indicate that the categorization or characteristics of one or more entities is changing and should be confirmed before one or more enforcement points are updated based on the changed categorization or characteristics. After conformation, the access rules may be changed.

Network monitor device 102 may be a computing system, network device (e.g., router, firewall, an access point), network access control (NAC) device, intrusion prevention system (IPS), intrusion detection system (IDS), deception device, cloud-based device, virtual machine based system, etc. Network monitor device 102 may be communicatively coupled to the network device 104 in such a way as to receive network traffic flowing through the network device 104 (e.g., port mirroring, sniffing, acting as a proxy, passive monitoring, etc.). In some embodiments, network monitor device 102 may include one or more of the aforementioned devices. In various embodiments, network monitor device 102 may further support high availability and disaster recovery (e.g., via one or more redundant devices).

In some embodiments, network monitor device 102 may monitor a variety of protocols (e.g., Samba, hypertext transfer protocol (HTTP), secure shell (SSH), file transfer protocol (FTP), transfer control protocol/internet protocol (TCP/IP), user datagram protocol (UDP), Telnet, HTTP over secure sockets layer/transport layer security (SSL/TLS), server message block (SMB), point-to-point protocol (PPP), remote desktop protocol (RDP), windows management instrumentation (WMI), windows remote management (WinRM), etc.).

The monitoring of entities by network monitor device 102 may be based on a combination of one or more pieces of information including traffic analysis, information from external or remote systems (e.g., system 150), communication (e.g., querying) with an aggregation device (e.g., aggregation device 106), and querying the entity itself (e.g., via an API, CLI, web interface, SNMP, etc.), which are described further herein. Network monitor device 102 may be operable to use one or more APIs to communicate with aggregation device 106, device 120, device 130, or system 150. Network monitor device 102 may monitor for or scan for entities that are communicatively coupled to a network via a NAT device (e.g., firewall, router, etc.) dynamically, periodically, or a combination thereof.

Information from one or more external or $3^{rd}$ party systems (e.g., system 150) may further be used for determining one or more tags or characteristics for a entity. For example, a vulnerability assessment (VA) system may be queried to verify or check if an entity is in compliance and provide that information to network monitor device 102. External or $3^{rd}$ party systems may also be used to perform a scan or a check on an entity to determine a software version.

Device 130 can include agent 140. The agent 140 may be a hardware component, software component, or some combination thereof configured to gather information associated with device 130 and send that information to network monitor device 102. The information can include the operating system, version, patch level, firmware version, serial number, vendor (e.g., manufacturer), model, asset tag, software executing on an entity (e.g., anti-virus software, malware detection software, office applications, web browser(s), communication applications, etc.), services that are active or configured on the entity, ports that are open or that the entity is configured to communicate with (e.g., associated with services running on the entity), media access control (MAC) address, processor utilization, unique identifiers, computer name, account access activity, etc. The agent 140 may be configured to provide different levels and pieces of information based on device 130 and the information available to agent 140 from device 130. Agent 140 may be able to store logs of information associated with device 130. Network monitor device 102 may utilize agent information from the agent 140. While network monitor device 102 may be able to receive information from agent 140, installation or execution of agent 140 on many entities may not be possible, e.g., IoT or smart devices.

System 150 may be one or more external, remote, or third party systems (e.g., separate) from network monitor device 102 and may have information about devices 120 and 130 and network coupled devices 122*a-b*. System 150 may include a vulnerability assessment (VA) system, a threat detection (TD) system, endpoint management system, a mobile device management (MDM) system, a firewall (FW) system, a switch system, an access point system, etc. Network monitor device 102 may be configured to communicate with system 150 to obtain information about devices 120 and 130 and network coupled devices 122*a-b* on a periodic basis, as described herein. For example, system 150 may be a vulnerability assessment system configured to determine if device 120 has a computer virus or other indicator of compromise (IOC).

The vulnerability assessment (VA) system may be configured to identify, quantify, and prioritize (e.g., rank) the vulnerabilities of an entity. The VA system may be able to catalog assets and capabilities or resources of an entity, assign a quantifiable value (or at least rank order) and importance to the resources, and identify the vulnerabilities or potential threats of each resource. The VA system may provide the aforementioned information for use by network monitor device 102.

The advanced threat detection (ATD) or threat detection (TD) system may be configured to examine communications that other security controls have allowed to pass. The ATD system may provide information about an entity including, but not limited to, source reputation, executable analysis, and threat-level protocols analysis. The ATD system may thus report if a suspicious file has been downloaded to a device being monitored by network monitor device 102.

Endpoint management systems can include anti-virus systems (e.g., servers, cloud based systems, etc.), next-generation antivirus (NGAV) systems, endpoint detection and response (EDR) software or systems (e.g., software that record endpoint-system-level behaviors and events), compliance monitoring software (e.g., checking frequently for compliance).

The mobile device management (MDM) system may be configured for administration of mobile devices, e.g., smartphones, tablet computers, laptops, and desktop computers. The MDM system may provide information about mobile devices managed by MDM system including operating system, applications (e.g., running, present, or both) data, and configuration settings of the mobile devices and activity monitoring. The MDM system may be used get detailed mobile device information which can then be used for device monitoring (e.g., including device communications) by network monitor device 102.

The firewall (FW) system may be configured to monitor and control incoming and outgoing network traffic (e.g., based on security rules). The FW system may provide information about an entity being monitored including attempts to violate security rules (e.g., unpermitted account access across segments) and network traffic of the entity being monitored.

The switch or access point (AP) system may be any of a variety of network devices (e.g., network device 104 or aggregation device 106) including a network switch or an access point, e.g., a wireless access point, or combination thereof that is configured to provide an entity access to a network. For example, the switch or AP system may provide MAC address information, address resolution protocol (ARP) table information, device naming information, traffic data, etc., to network monitor device 102 which may be used to monitor entities and control network access of one or more entities. The switch or AP system may have one or more interfaces for communicating with IoT or smart devices or other devices (e.g., ZigBee™, Bluetooth™ etc.), as described herein. The VA system, ATD system, and FW system may thus be accessed to get vulnerabilities, threats, and user information of an entity being monitored in real-time which can then be used to determine a risk level of the entity.

Aggregation device 106 may be configured to communicate with network coupled devices 122*a-b* and provide network access to network coupled devices 122*a-b*. Aggregation device 106 may further be configured to provide information (e.g., operating system, entity software information, entity software versions, entity names, application present, running, or both, vulnerabilities, patch level, etc.) to network monitor device 102 about the network coupled devices 122*a-b*. Aggregation device 106 may be a wireless access point that is configured to communicate with a wide variety of devices through multiple technology standards or protocols including, but not limited to, Bluetooth™, Wi-Fi™, ZigBee™, Radio-frequency identification (RFID), Light Fidelity (Li-Fi), Z-Wave, Thread, Long Term Evolution (LTE), Wi-Fi™ HaLow, HomePlug, Multimedia over Coax Alliance (MoCA), and Ethernet. For example, aggregation device 106 may be coupled to the network device 104 via an Ethernet connection and coupled to network coupled devices 122*a-b* via a wireless connection. Aggregation device 106 may be configured to communicate with network coupled devices 122*a-b* using a standard protocol with proprietary extensions or modifications.

Aggregation device 106 may further provide log information of activity and properties of network coupled devices 122*a-b* to network monitor device 102. It is appreciated that log information may be particularly reliable for stable network environs cents (e.g., where the types of devices on the network do not change often). The log information may include information of updates of software of network coupled devices 122*a-b*.

Figure 2:
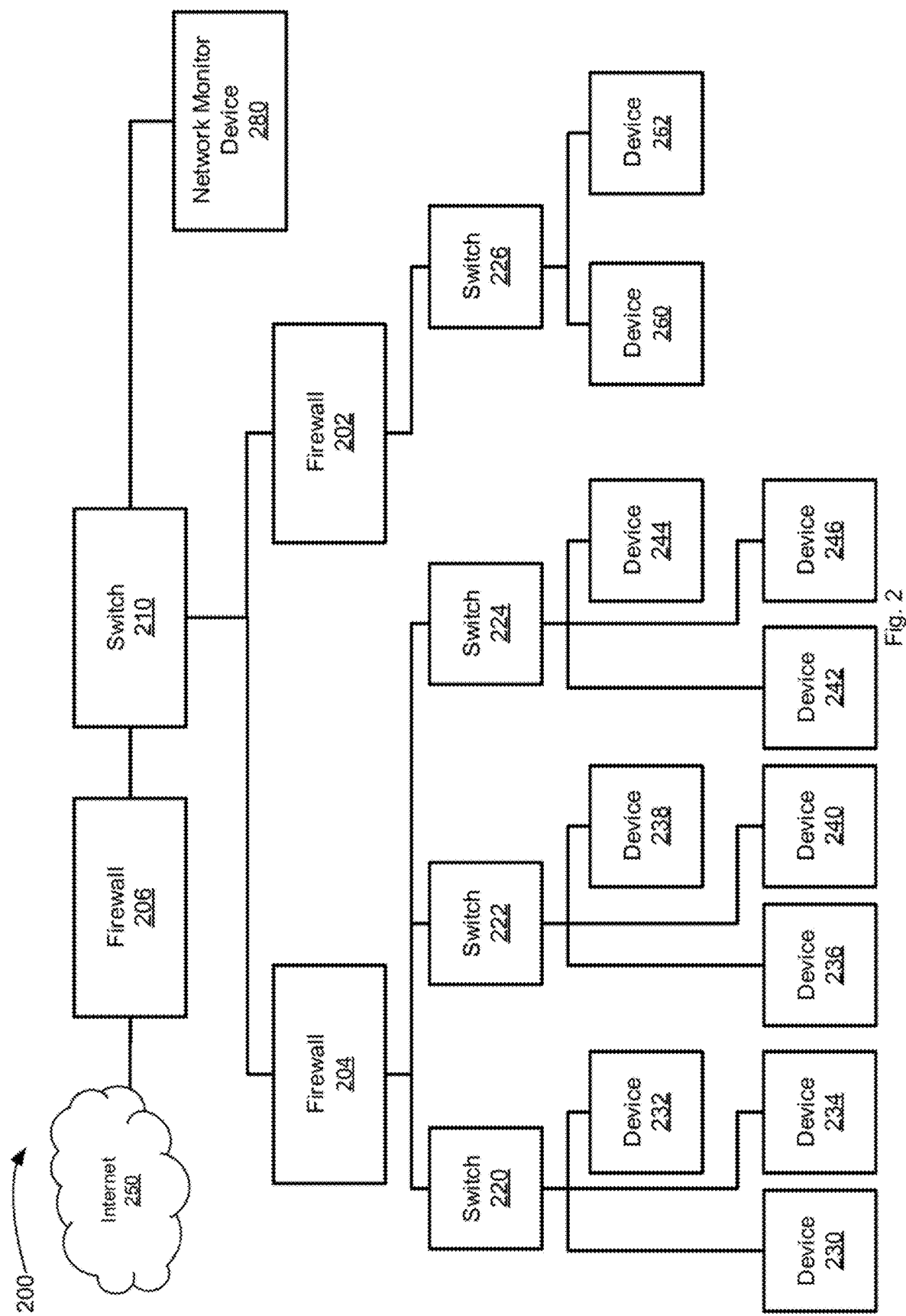
FIG. 2 depicts an illustrative network topology in accordance with one implementation of the present disclosure.

FIG. 2 depicts an illustrative network topology in accordance with one implementation of the present disclosure. FIG. 2 depicts an example network 200 with multiple enforcement points (e.g., firewalls 202-206 and switches 210 and 220-226) and a network monitor device 280 (e.g., network monitor device 102) which may handle access control or micro-segmentation management, determine one or more access control rules based on one or more characteristics of an entity, and assign access rules to the enforcement points to implement an access policy.

FIG. 2 shows example devices 230-262 (e.g., devices 106, 122*a-b*, 120, and 130, other physical or virtual devices, users, etc.) and it is appreciated that more or fewer network devices or other entities may be used in place of the devices of FIG. 2. Example devices 230-262 may be any of a variety of computing devices, as described herein. For example, the enforcement points including firewalls 202-206 and switches 210 and 220-226 may be any entity (e.g., network device 104, cloud infrastructure, etc.) that is operable to allow traffic to pass, drop packets, restrict traffic, etc. Network monitor device 280 may be any of a variety of network devices, e.g., router, firewall, an access point, network access control (NAC) device, intrusion prevention system (IPS), intrusion detection system (IDS), deception device, cloud-based device, virtual machine based system, etc. Network monitor device 280 may be substantially similar network monitor device 102. Embodiments support IPv4, IPv6, and other addressing schemes. In some embodiments, network monitor device 280 may be communicatively coupled with firewalls 202-206 and switches 210 and 220-226 through additional individual connections (not shown) (e.g., to receive or monitor network traffic through firewalls 202-206 and switches 210 and 220-226).

Switches 210 and 220-226 communicatively couple the various devices of network 200 including firewalls 202-206, network monitor device 280, and devices 230-262. Firewalls 202-206 may perform network address translation (NAT) and firewalls 202-204 may communicatively couple the devices 230-262, which are behind the firewalls, with network monitor device 280, switch 210, and firewall 206. Firewall 206 communicatively couples network 200 to Internet 250 and firewall 206 may restrict or allow access to Internet 250 based on particular rules or ACLS configured on firewall 206. Firewalls 202-206 and switches 210 and 220-226 are enforcement points, as described herein.

Network monitor device 280 is configured to identify, classification, determine one or more characteristics of entities (e.g., devices 230-262), or a combination thereof on network 200, as described herein. Network monitor device 280 is configured to determine one or more access rules based the characteristics of devices 230-262, as described herein. The access rules can include ACLs customized or tailored to an entity based on the characteristics of the entity (e.g., a user logged into an entity, rules to allow printing at a printer but not allow the printer to communicate on particular ports or with other entities), as described herein.

Network monitor device 280 is operable to determine one or more enforcement points closest to an entity (e.g., a network device or enforcement point where a device is communicatively coupled), as described herein. For example, the enforcement point closest to the devices 230-234 is switch 220 and the enforcement point closed to devices 260-262 is switch 226.

Network monitor device 280 may further configure enforcement actions or assign access rules (e.g., ACLs) on switches 220-226 based on the characteristics of the entities (e.g., devices 230-262) coupled thereto, as described herein. For example, network monitor device 280, can assign access control rules to switch 220 to control or limit communications of device 230 based on being a printer and restrict device 230 from communicating with other printers. This would prevent a compromise or attack from spreading between multiple printers. The access control rules may be implemented by configuring one or more ACLs on switch 220. Network monitor device 280 thus can assign entity specific or customized access control rules at the edge of network 200.

Network monitor device 280 can access network traffic from network 200 (e.g., via firewalls 202-206) and may determine additional enforcement points of network 200 (e.g., switches 210 and 220-226). Network monitor device 280 may then query each of the enforcement points for the configuration information including access rules or policies or segmentation rules or policies. Network monitor device 280 may then translate that the configuration information into one or more portions (e.g., one or more access control rules, for instance, ACLS) of an access policy which may then be added to an existing access policy. Network monitor device 280 further can determine access control rules based on analysis of network traffic (e.g., based on a source and destination connections mapping), as described herein. The access policy based on the network traffic can then be combined with one or more access policy portions based on configuration information from the enforcement points. The access policy may further be based on a template or other resources.

Network monitor device 280 may visually render, display, or present the access rules of an access policy. In some embodiments, network monitor device 280 is configured to automatically implement the segmentation policy or a portion thereof across multiple enforcement points in response to an implementation command. As part of the implementation, network monitor device 280 is configured to translate the access policy into specific configuration information (e.g., specific ACL commands) for switches 210 and 220-226 and firewalls 202-206 and communicate the specific configuration information for switches 210 and 220-226 and firewalls 202-206, as described herein.

For example, if devices 234 and 236 are IoT devices and device 230 is an accounting file server, network monitor device 280 may determine characteristics of devices 230, 234 and 236 and classify devices 230, 234 accordingly. Under traditional segmentation methodologies, if devices 230-246 are on a single segment, for example, a department segment, devices 230-246 may each communicate with each other. Similarly, devices 260 and 262 may communicate with each other (e.g., based on being on in a single segment). This ability to communicate between devices may mean that a compromise or attack could spread (e.g., laterally) between any of devices 230-246 or devices 260-262. Similarly, if devices 232, 238, and 244 are IP cameras in an IP camera segment which allows devices in the IP camera segment to communicate with one another then a compromise or attack could spread (e.g., laterally) between any of devices 232, 238, and 244. Embodiments are configured to determine based on characteristics described herein and the like) access rules to be assigned to enforcement points (e.g., switches 220-226) to control communications of devices 230-262 thereby preventing lateral movement of an attack or comprise, as described herein. For example, an access policy may specify that IP cameras are not allowed to communicate with one another. Network monitor device 280 may determine access rules (e.g., ACLs) based on that access policy so that switch 220 block packets with a source IP associated with device 232 and a destination of the IP address associated with device 238.

In some embodiments, network monitor device 280 may further access configuration information from firewall 204, switches 220-226, or a combination thereof and translate the configuration information into a portion of an access policy. For example, switch 220 may not be configured to block IoT device 230 from communicating with devices 232-234 while firewall 204 prevents IoT device 230 from communicating with firewall 206. Network monitor device 280 may access the access rules of firewall 204 and translate the configuration into an access policy. Based on the access policy of firewall 204, characteristics of IoT device 230, or combination thereof, network monitor device 280 may determine that IoT device 230 should not be allowed to communicate with devices 232 and 234. Network monitor device 280 may thus integrate existing access policies or rules present on one or more enforcement points and add access rules to one or more enforcement points based on one or more characteristics of IoT device 230. Network monitor device 280 further supports blocking user, services, etc., from accessing portions of a network.

Figure 3:
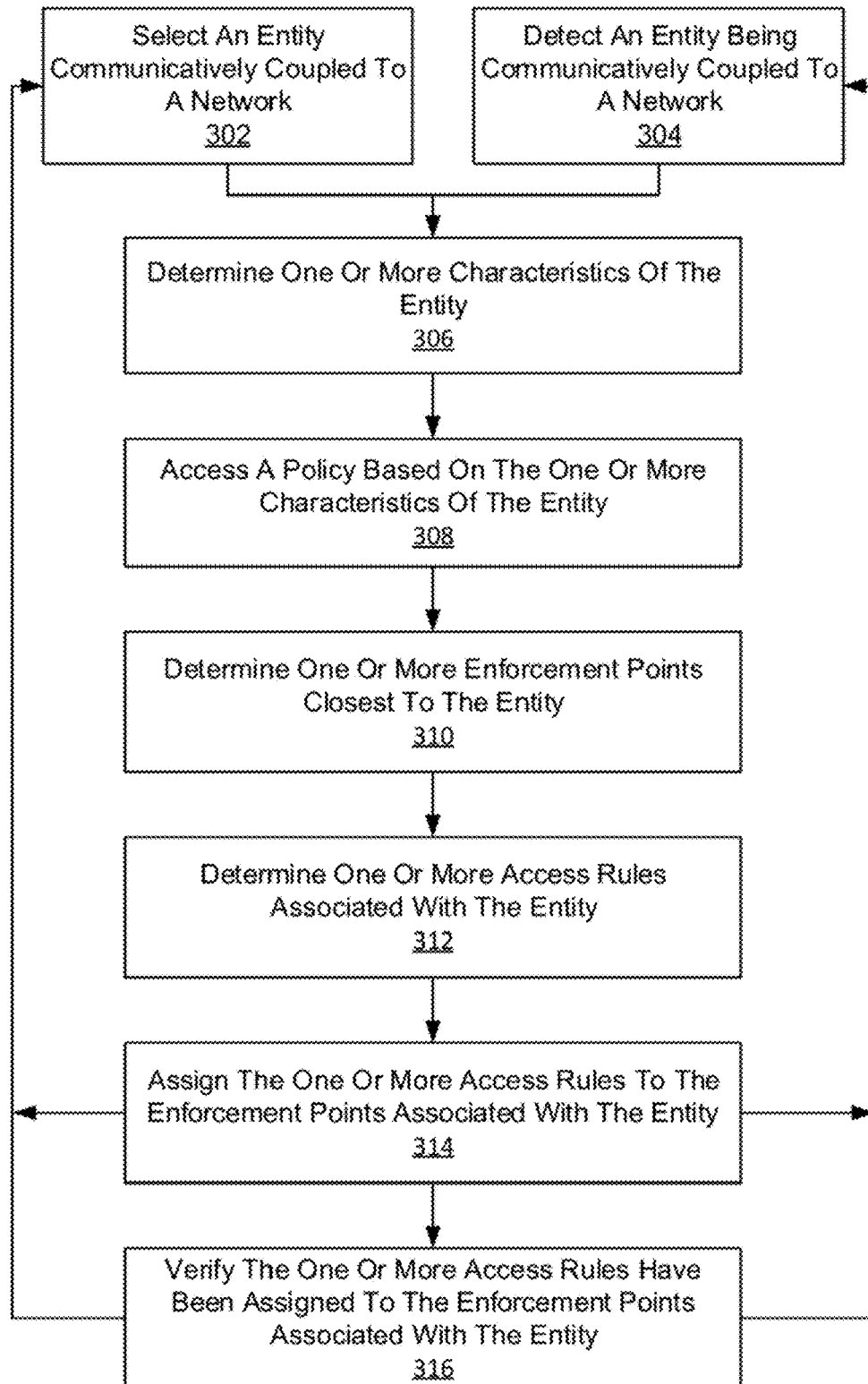
FIG. 3 depicts a flow diagram of aspects of a method for access management in accordance with one implementation of the present disclosure.

With reference to FIG. 3, flowchart 300 illustrates example operations used by various embodiments. Although specific operation blocks ("blocks") are disclosed in flowchart 300, such blocks are examples. That is, embodiments are well suited to performing various other blocks or variations of the blocks recited in flowchart 300. It is appreciated that the blocks in flowchart 300 may be performed in an order different than presented, and that not all of the blocks in flowchart 300 may be performed.

FIG. 3 depicts a flow diagram of aspects of a method for access management in accordance with one implementation of the present disclosure. Various portions of flowchart 300 may be performed by different components (e.g., components of system 400) of an entity (e.g., network monitor device 102 or network monitor device 280). Flowchart 300 depicts a process for configuring one or more access rules for an entity (e.g., on one or more enforcement points).

At block 302, an entity communicatively coupled to a network is selected. The entity may be selected as part of a periodic scan of the network (e.g., a scan of network 100 by network monitoring device 102). The entity may further be selected as part of a continuous, real-time, or combination thereof scan of the network. The entity may be an endpoint, a user, etc., as described herein.

At block 304, an entity being communicatively coupled to the network is detected. The entity may be detected upon being commmunicatively coupled to the network (e.g., being communicatively coupled to network device 104 or other enforcement point). The detecting of the entity coupled to the network may include detecting the entity in response to the entity being recoupled or readmitted to the network. This may further include detecting that a user has logged into a machine or the active user account on a device has changed.

At block 306, one or more characteristics of the entity are determined. The one or more characteristics may be collected or accessed from various of sources including, from the entity, from the network environment, network devices or enforcement points (e.g., one or more switches, routers, firewalls, etc.) and any other device or resource communicatively coupled to the network (e.g., network 100) including other systems (e.g., system 150). The characteristics (e.g., classification, identification, etc.) may be determined by an entity (e.g., network monitor device 102 or network monitor device 280) that are configured to perform one or more blocks of flowchart 300.

The one or more characteristics may include classification, identification, device categorization, user categorization, location, compliance, risk, or a combination thereof which may be based on fingerprints, signatures, entity behavior, etc., as described herein. Embodiments are able to determine the one or more characteristics of the entity agentlessly (e.g., based on observing network traffic) thereby allowing characteristics of an entity to be quickly determined for entities that do not have or support an agent as well as without needing an agent to be installed for entities that do support an agent. In some embodiments, the one or more characteristics are determined in real-time. For example, a compliance characteristic may be determined based on an antivirus scan that is specified in the access policy.

At block 308, a policy based on the one or more characteristics of the entity are accessed. One or more policies may be accessed and any of the one or more policies that apply based on the one or more characteristics of the entity can be accessed. For example, a policy can be accessed based on the operating system of the entity such that a policy specific to the particular operating system of the entity is accessed.

At block 310, one or more enforcement points closest to the entity are determined. The determination may be based on data associated with the enforcement point closest to the entity. The data associated with the enforcement point (e.g., switch, wireless access point, etc.) may be a cache or other store of the network device or enforcement point that includes a MAC address, an IP address, or other information associated with the entity. For example, the determination may be based on the MAC address, IP address, or combination thereof being associated with a port of a switch device where the entity is communicatively coupled. In some embodiments, access rules (e.g., ACLs) can be applied to more than the connecting network entity where an entity is directly connected. For example, an access rules, e.g., ACL, can be applied to a higher hierarchy switch or to a centralized controller (e.g., a wireless controller).

At block 312, one or more enforcement actions or access rules associated with the entity are determined. The access rules may be based on the access policy and the one or more characteristics of the device. For example, where the entity is a printer, one or more access rules (e.g., ACLs) may be determined that limits access of the printer to communicate with smartphones, desktops, and laptop (e.g., based on VLANs associated with those devices) and prevents the printer from communicating with IP cameras and VOIP devices. In some embodiments, the access policy may be used to determine one or more access rules for an entity continuously and in real time.

For example, an accounting server may be determined to be subject to a non-Internet access policy meaning that it cannot access the Internet because of the sensitive data stored on the accounting server. The access rules for this may include blocking communication of the accounting server on port 80 or with entities beyond the enforcement point (e.g., switch) where the accounting server is coupled. The accounting server may thus be restricted from communicating only with other devices that are communicatively coupled to the same enforcement point (e.g., switch).

In some embodiments, the current access rules of the network device may be accessed and used to determine the access rules to be applied to the entities (e.g., block 314). For example, if an access rule is accessed from an enforcement point that blocks a printer from communicating with IoT devices but an access rule that blocks the printer from communicating with VOIP is not present on the enforcement point, then an access rule that blocks the printer from accessing VOIP devices may be added to access rules to be assigned or configured on the enforcement point.

At block 314, one or more enforcement actions or access rules are assigned to the enforcement point associated with the entity (e.g., the enforcement point closest to the entity, for instance, the network device where the entity is communicatively coupled to the network). The access rules may be determined based on the access policy, e.g., preventing communication beyond an enforcement point, restricting the ports or protocols that may be used, etc. Embodiments may use an application programming interface (API) or a command line interface (CLI), simple network management protocol (NMP) interface, etc., to assign, configure, or a combination thereof to assign or configure the access rules to the one or more enforcement points.

For example, if an entity is a Windows™ device on a third floor, the device will be determined to have a third floor location, and the enforcement points on the third floor are configured (e.g., via ACLs) to allow the device to communicate with resources available to a device on the third floor (e.g., servers, printers, data center, etc., on the third floor). A compliance characteristic could be determined based on being compliant with a compliance policy (e.g., anti-virus definitions are up to date, no malware is present on the device, operating system and application patches applied or updated, etc.). If the device is found to be non-compliant, e.g., after failing an anti-virus scan, a non-complaint anti-virus characteristic may be determined, which causes the enforcement points to be configured based on the access rules to only allow the device to communicate with anti-virus definitions or updates servers or substantially restrict communication thereto.

Block 302 may then be performed as part of a continuous, real-time, or combination thereof monitoring of the network to dynamically control access of entities on the network. Block 304 may also be performed each time an entity is communicatively coupled to the network (e.g., new devices and returning devices).

At block 316, the one or more access rules that have been assigned to one or more enforcement points associated with an entity are (optionally) verified. The one or more enforcement actions may be verified by accessing the configuration of an enforcement point (e.g., a switch) where the entity is communicatively coupled to the network and comparing the configuration to the one or more rules that were assigned to the one or more enforcement points. If the one or more rules that were assigned to the one or more enforcement points do not match the configuration of the enforcement point, the assignment of the one or more rules to the enforcement point may performed again. The one or more rules may be verified again and if the assignment was not successful (e.g., the configuration of the enforcement point does not match the assigned one or more rules) then a notification may be sent, as described herein, that the enforcement point is unable to be configured with the one or more rules. The verification may be performed continuously to allow monitoring for changes (e.g., misconfiguration, improper configuration, or compromise). Blocks 302 or 304 may then be performed.

Figure 4:
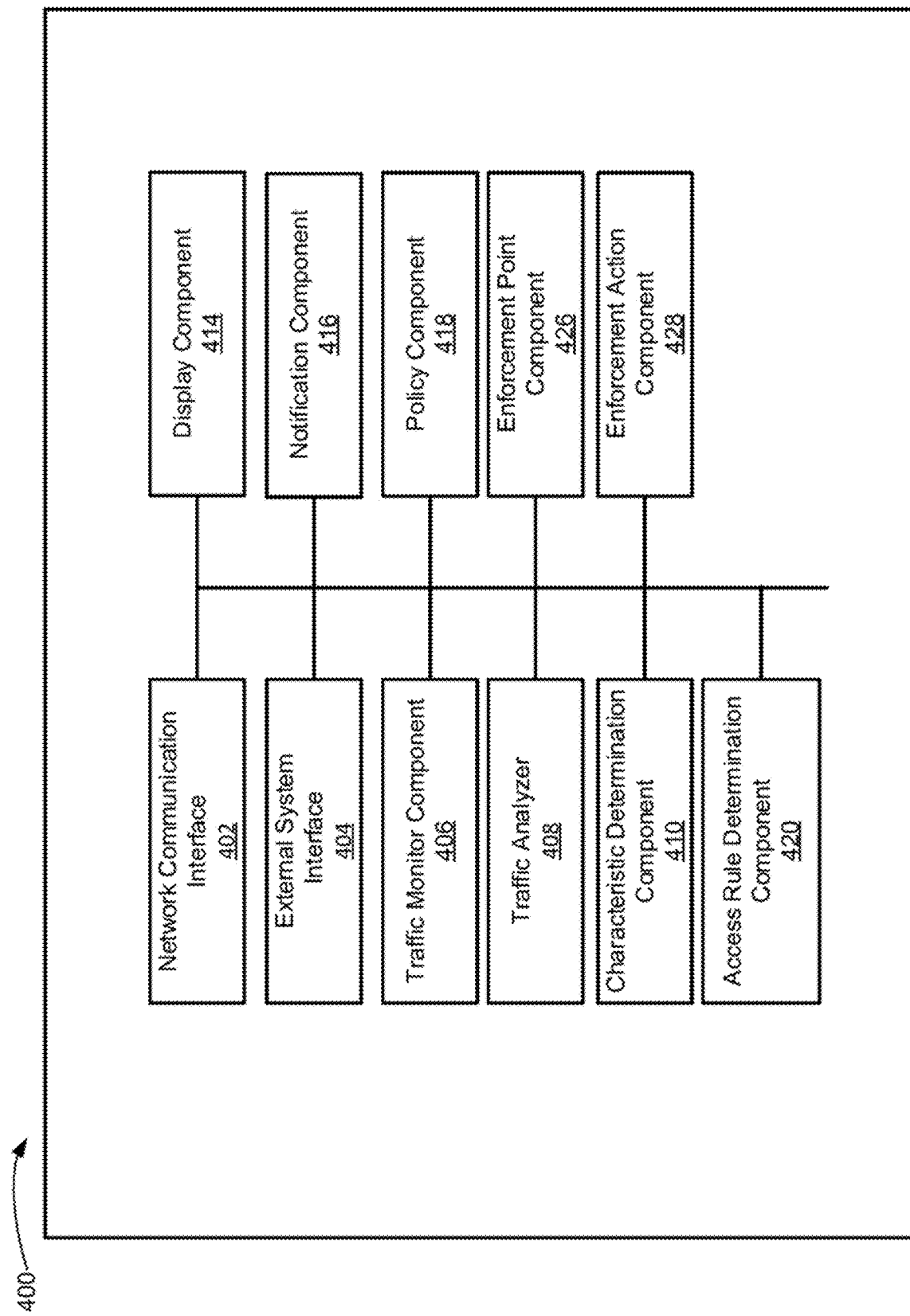
FIG. 4 depicts illustrative components of a system for access management in accordance with one implementation of the present disclosure.

FIG. 4 illustrates example components used by various embodiments. Although specific components are disclosed in system 400, it should be appreciated that such components are examples. That is, embodiments are well suited to having various other components or variations of the components recited in system 400. It is appreciated that the components in system 400 may operate with other components than those presented, and that not all of the components of system 400 may be required to achieve the goals of system 400.

FIG. 4 depicts illustrative components of a system for access management in accordance with one implementation of the present disclosure. Example system 400 or access manager 400 includes a network communication interface 402, an external system interface 404, a traffic monitor component 406, a traffic analyzer 408, characteristic determination component 410, a display component 414, a notification component 416, a policy component 418, an access rule determination component 420, enforcement point component 426, and enforcement action component 428. The components of system 400 may be part of a computing system or other electronic device (e.g., network monitor device 102 or network monitor device 280) or a virtual machine or device and be operable to monitor and one or more entities communicatively coupled to a network, monitor network traffic, and manage access policies and configure or assign access rules on one or more enforcement points, as described herein. For example, the system 400 may further include a memory and a processing device, operatively coupled to the memory, which may perform the operations of or execute the components of system 400. The components of system 400 may access various data and characteristics associated with an entity (e.g., network communication information) and data associated with one or more entities. It is appreciated that the modular nature of system 400 may allow the components to be independent and allow flexibility to enable or disable individual components or to extend, upgrade, or combination thereof components without affecting other components thereby providing scalability and extensibility. System 400 may perform one or more blocks of flow diagram 300.

Communication interface 402 is operable to communicate with one or more entities (e.g., network device 104, firewalls 202-206, switches 210 and 220-226, other devices coupled thereto, devices 230-262, etc.) coupled to a network that are coupled to system 400 and receive or access information about entities (e.g., entity communications, entity characteristics, etc.), access policies, segmentation policies, and access rules (e.g., from one or more enforcement points), as described herein. The communication interface 402 may be operable to work with one or more components to initiate access to characteristics or determination of characteristics of an entity to allow determination of one or more access rules and assigning access rules to the one or more enforcement points closest to the entity, as described herein. Communication interface 402 may be used to receive and store network traffic for access policy management, as described herein.

External system interface 404 is operable to communicate with one or more third party, remote, or external systems to access information including characteristics about an entity. External system interface 404 may further store the accessed information in a data store. For example, external system interface 404 may access information from a vulnerability assessment (VA) system to enable determination of one or more compliance or risk characteristics associated with the entity. External system interface 404 may be operable to communicate with a vulnerability assessment (VA) system, an advanced threat detection (ATD) system, a mobile device management (MDM) system, a firewall (FW) system, a switch system, an access point (AP) system, etc. External system interface 404 may query a third party system using an API or CLI. For example, external system interface 404 may query a firewall or a switch for information (e.g., network session information) about an entity or for a list of entities that are communicatively coupled to the firewall or switch and communications associated therewith. In some embodiments, external system interface 404 may query a switch, a firewall, or other system for information of communications associated with an entity.

Traffic monitor component 406 is operable to monitor network traffic to determine if a new entity has joined the network or an entity has rejoined the network and monitor traffic for analysis by traffic analyzer 408, as described herein.

Traffic analyzer 408 is configured to perform analysis of network traffic (e.g., in real-time, with machine learning, etc.) to and from an entity thereby providing analysis of end to end communications of an entity (e.g., including determining a connection map or sources and destinations of one or more communications), as described herein. Traffic analyzer 408 may further be able to determine one or more enforcement points that are closest to an entity (e.g., based on connection hops between an entity and network monitor device 280), as described herein. Traffic analyzer 408 may have a packet engine operable to access packets of network traffic (e.g., passively) and analyze the network traffic. The traffic analyzer 408 may be configured to perform active or passive traffic analysis or a combination thereof. The traffic analyzer 408 may further be able to access and analyze traffic logs from one or more entities (e.g., network device 104, system 150, or aggregation device 106) or from an entity being monitored. The traffic analyzer 408 may further be able to access traffic analysis data associated with an entity being monitored, e.g., where the traffic analysis is performed by a third party system. Information of traffic analyzer 408 may be stored, displayed, and used as a basis for access rule determination configuration, verification, or the like, as described herein.

Characteristic determination component 410 is configured to determine one or more characteristics of an entity, as described herein. The entity characteristics can then be stored and used by other components for performing access rule management and configuration, as described herein.

Access rule determination component 420 is configured to determine or select an access policy based on the one or more characteristics of one or more entities and network traffic, as described herein. Access rule determination component 420 is further configured to determine one or more access rules to be applied to one or more enforcement points associated with an entity (e.g, one or more enforcement points closest to the entity), as described herein. In some embodiments, the access rules may be ACLs, as described herein.

In some embodiments, access rule determination component 420 may be configured for accessing configuration information including access rules or segmentation policies from one or more enforcement points, as described herein. The access rules or segmentation policies may then be used to determine access rules, as described herein. Access rule determination component 420 may be further configured to translate enforcement point configuration information (e.g., from a switch) into a portion of an access policy (e.g., a generic access policy independent of enforcement point technology or vendor) to include the current configuration of the enforcement points on a network, as described herein. The access policy may further be determined based on a template or other file, as described herein.

Display component 414 is configured to optionally display one or more graphical user interfaces or other interfaces (e.g., command line interface) for depicting various information associated with entities and access rules, as described herein. In some embodiments, display component 414 may display or render a network graph of entities, access rules associated with entities, and other access rule information (e.g., access policies, access templates, etc.).

Notification component 416 is operable to initiate one or more notifications based on the results of monitoring communications or characteristics of one or more entities and access rules (e.g., alerting of access rule enforcement on communications, access rule implementation, etc.), as described herein. The notification may be any of a variety of notifications, e.g., IT ticket, email, SMS, a HTTP notification, etc., as described herein.

Policy component 418 is operable for initiating or triggering one or more remediation actions or security actions according to one or more policies, e.g., based on an access rule violation, as described herein. Policy component 418 may further be configured to perform other operations including checking compliance status, finding open ports, etc. In some embodiments, policy component 418 may verify that an assignment of one or more access rules to one or more enforcements points has been properly assigned or configured. Policy component 418 may restrict network access, signal a patch system or service, signal an update system or service, etc., as described herein. The policy component 418 may thus, among other things, invoke automatically patching, automatically updating, and automatically restrict network access of an entity (e.g., that has out-of-date software or based on access rule violation or attempted violation).

The actions may include restricting network access to a particular level (e.g., full, limited, or no network access), remediation actions (e.g., triggering patch systems or services, triggering update systems or services, triggering third party product action, etc.), informational actions (e.g., sending an email notification to a user or IT administrator or creating an IT ticket reflecting the level of compliance), and logging actions (e.g., logging or storing the compliance level).

Enforcement point component 426 is configured to determine one or more enforcement points (e.g., network devices) associated with an entity or within one or more networks, as described herein. For example, enforcement point component 426 may determine the enforcement point where an entity is communicatively coupled to a network (e.g., the enforcement point closest to the entity). In some embodiments, enforcement point component 426 is further configured to access or request configuration information from enforcement points which may then be used to determine an access policy, as described herein.

Enforcement action component 428 is configured to assign one or more enforcement actions or access rules to one or more enforcement points associated with an entity, as described herein. Enforcement action component 428 is further configured to translate a generic access policy into configuration information (e.g., customized information or commands for a switch ACL) for one or more enforcement points of a network. Enforcement action component 428 may further be configured to apply or communicate the configuration information to the enforcement points, as described herein. In some embodiments, enforcement action component 428 may act as a controller of the enforcement points of a network (e.g., a software defined controller).

The system 400 may be software stored on a non-transitory computer readable medium having instructions encoded thereon that, when executed by a processing device, cause the processing device to select an entity communicatively coupled to a network and determine one or more characteristics of the entity. The instructions may further cause the processing device to select an access policy based on the one or more characteristics of the entity and determine one or more enforcement points closest to the entity. The instructions may further cause the processing device to determine one or more access rules to be assigned to the one or more enforcement points based on the access policy and assign the one more access rules to the one or more enforcement points closest to the entity.

In some embodiments, the instructions may further cause the processing device to verify assignment of the one or more access rules to the one or more enforcement points closest to the entity. In various embodiments, the one or more access rules are assigned to the enforcement point based on a port associated with the entity. In some embodiments, the one or more access rules are configured to control network access in a manner customized for the entity. In various embodiments, the one or more characteristics of the entity are determined without use of an agent.

In some embodiments, the entity is selected based on being detected communicatively coupling to the network. In various embodiments, the one or more characteristics of the entity include at least one of an identification of the entity, a classification of the entity, location, a user, compliance, or risk. In some embodiments, the one or more enforcement points comprise at least one of a firewall, a router, a switch, a portion of cloud infrastructure, hypervisor, software-defined networking (SDN) controller, or virtual firewall. In various embodiments, the one or more access miles are configured using at least one of an application programming interface (API), command line interface (CLI), or a simple network management protocol (SNMP) interface.

In some embodiments, the one or more access rules are associated with a destination of communications sent from the entity. In various embodiments, the one or more access rules assigned to an enforcement point comprises at least one of an access control list (ACL), a switch command, or rule or a cloud packet filtering ACL. In some embodiments, the entity comprises at least one of a device, an endpoint, a virtual machine, a service, a serverless service, a container, or a user.

Figure 5:
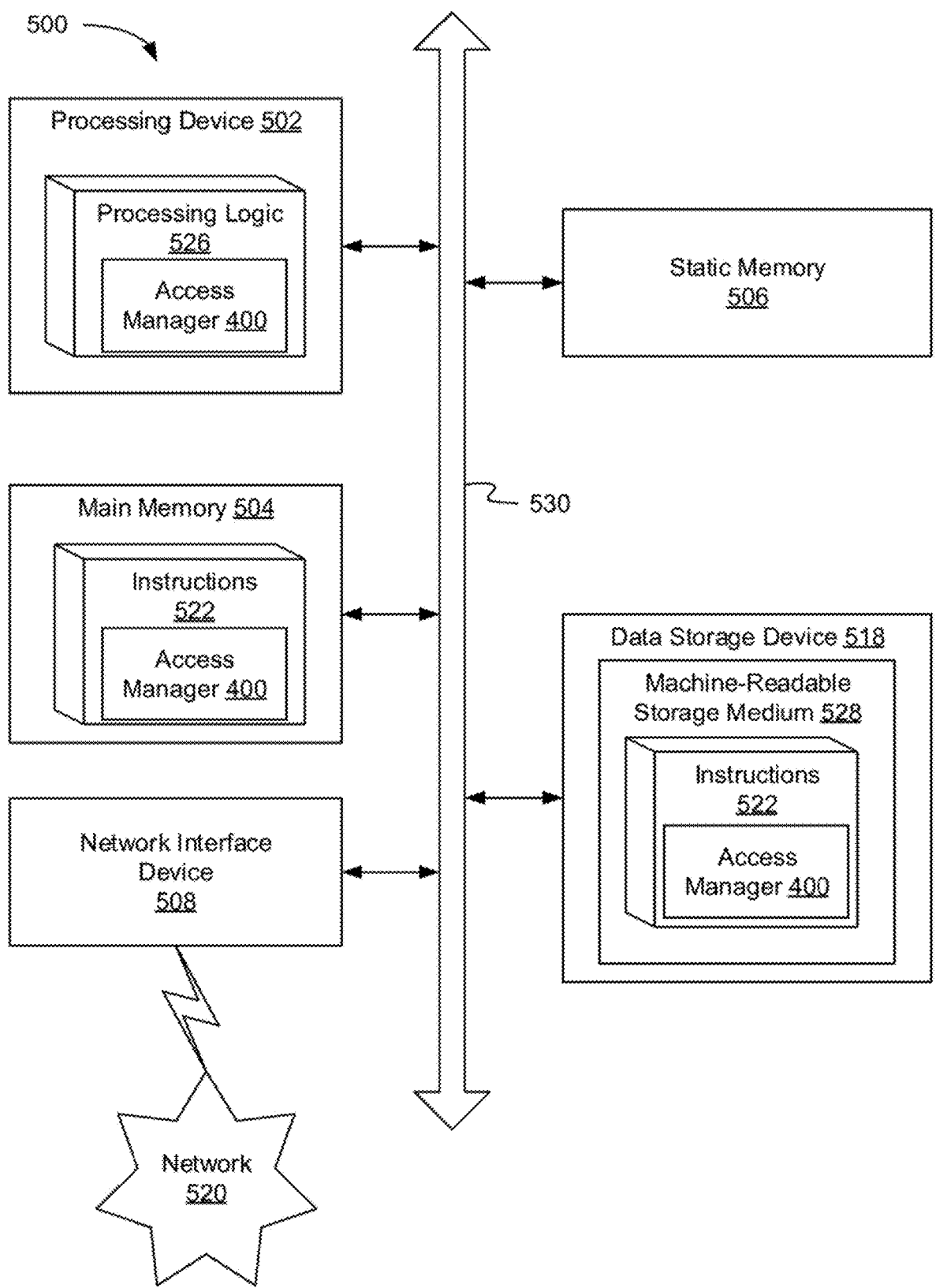
FIG. 5 is a block diagram illustrating an example computer system, in accordance with one implementation of the present disclosure.

FIG. 5 illustrates a diagrammatic representation of a machine in the example form of a computer system 500 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 500 may be representative of a server, such as network monitor device 102 running access manager 400 to perform access management including determining one if more access rules based on one or more characteristics and one or more policies associated with an entity and assigning or configuring the one or more access rules to an enforcement point, as described herein.

The exemplary computer system 500 includes a processing device 502, a main memory 504 (e.g., read-only memory (ROM), flash memory, dynamic random access memory (DRAM), a static memory 506 (e.g., flash memory, static random access memory (SRAM), etc.), and a data storage device 518, which communicate with each other via a bus 530. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute processing logic 526, which may be one example of access manager 400 shown in FIG. 4, for performing the operations and steps discussed herein.

The data storage device 518 may include a machine-readable storage medium 528, on which is stored one or more set of instructions 522 (e.g., software) embodying any one or more of the methodologies of operations described herein, including instructions to cause the processing device 502 to execute access manager 400. The instructions 522 may also reside, completely or at least partially, within the main memory 504 or within the processing device 502 during execution thereof by the computer system 500; the main memory 504 and the processing device 502 also constituting machine-readable storage media. The instructions 522 may further be transmitted or received over a network 520 via the network interface device 508.

The machine-readable storage medium 528 may also be used to store instructions to perform a method for managing access for entities at the edge of the network, as described herein. While the machine-readable storage medium 528 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Reference throughout this specification to "one embodiment" or "an embodiment" means that a particular feature, structure, or characteristic described in connection with the embodiments included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art win recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method comprising:
  selecting an entity communicatively coupled to a network;
  monitoring network traffic associated with the entity;
  determining one or more characteristics of the entity based on the network traffic associated with the entity;
  selecting an access policy based on the one or more characteristics of the entity;
  determining one or more enforcement points closest to the entity based on the network traffic;
  retrieving configuration information from the one or more enforcement points;
  translating the configuration information into current access rules of the one or more enforcement points;
  determining, by a processing device, one or more new access rules to be assigned to the one or more enforcement points based on the access policy, the current access rules, and the one or more characteristics of the entity, wherein the one or more new access rules are configured to control network access in a manner customized for the entity comprising applying the one or more new access rules on a per entity basis;

applying the one or more new access rules to the one or more enforcement points closest to the entity, wherein the one or more new access rules enforce the access policy at the one or more enforcement points; and verifying assignment of the one or more new access rules to the one or more enforcement points closest to the entity.

2. The method of claim 1, wherein the one or more new access rules are assigned to the one or more enforcement points based on a port associated with the entity.

3. The method of claim 1, wherein the one or more characteristics of the entity are determined without use of an agent.

4. The method of claim 1, wherein the entity is selected based on being detected communicatively coupling to the network.

5. The method of claim 1, wherein the one or more characteristics of the entity include at least one of an identification of the entity, a classification of the entity, location, a user, compliance, or risk.

6. The method of claim 1, wherein the one or more enforcement points comprise at least one of a firewall, a router, a switch, a portion of cloud infrastructure, hypervisor, software-defined networking (SDN) controller, or virtual firewall.

7. The method of claim 1, wherein the one or more new access rules are configured using at least one of an application programming interface (API), command line interface (CLI), or a simple network management protocol (SNMP) interface.

8. The method of claim 1, wherein the one or more new access rules are associated with a destination of communications sent from the entity.

9. The method of claim 1, wherein the one or more new access rules assigned to an enforcement point comprises at least one of an access control list (ACL), a switch command, or rule or a cloud packet filtering ACL.

10. The method of claim 1, wherein the entity comprises at least one of a device, an endpoint, a virtual machine, a service, a serverless service, a container, or a user.

11. A system comprising:
a memory; and
a processing device, operatively coupled to the memory, to:
select an entity communicatively coupled to a network;
monitor network traffic associated with the entity;
determine one or more characteristics of the entity based on the network traffic associated with the entity;
select an access policy based on the one or more characteristics of the entity;
determine one or more enforcement points closest to the entity based on the network traffic;
retrieve configuration information from the one or more enforcement points;
translate the configuration information into current access rules of the one or more enforcement points;
determine one or more new access rules to be assigned to the one or more enforcement points based on the access policy, the current access rules, and the one or more characteristics of the entity, wherein the one or more new access rules are configured to control network access in a manner customized for the entity comprising applying the one or more new access rules on a per entity basis;
apply the one or more new access rules to the one or more enforcement points closest to the entity, wherein the one or more new access rules enforce the access policy at the one or more enforcement points; and
verify assignment of the one or more new access rules to the one or more enforcement points closest to the entity.

12. The system of claim 11, wherein the one or more new access rules are assigned to the one or more enforcement points based on a port associated with the entity.

13. The system of claim 11, wherein the one or more characteristics of the entity are determined without use of an agent.

14. The system of claim 11, wherein the one or more characteristics of the entity include at least one of an identification of the entity, a classification of the entity, location, a user, compliance, or risk.

15. A non-transitory computer readable medium having instructions encoded thereon that, when executed by a processing device, cause the processing device to:
select an entity communicatively coupled to a network;
monitor network traffic associated with the entity;
determine one or more characteristics of the entity based on the network traffic associated with the entity;
select an access policy based on the one or more characteristics of the entity;
determine one or more enforcement points closest to the entity based on the network traffic;
retrieve configuration information from the one or more enforcement points;
translate the configuration information into current access rules of the one or more enforcement points;
determine, by the processing device, one or more new access rules to be assigned to the one or more enforcement points based on the access policy, the current access rules, and the one or more characteristics of the entity, wherein the one or more new access rules are configured to control network access in a manner customized for the entity comprising applying the one or more new access rules on a per entity basis;
apply the one or more new access rules to the one or more enforcement points closest to the entity, wherein the one or more new access rules enforce the access policy at the one or more enforcement points; and
verify assignment of the one or more new access rules to the one or more enforcement points closest to the entity.

16. The non-transitory computer readable medium of claim 15, wherein the one or more new access rules are assigned to the one or more enforcement points based on a port associated with the entity.

* * * * *